Aug. 13, 1929.    J. BLACKBURN    1,724,000
SLIDING GEAR TRANSMISSION AND METHOD OF OPERATING THE SAME
Filed Sept. 20, 1923    4 Sheets-Sheet 1
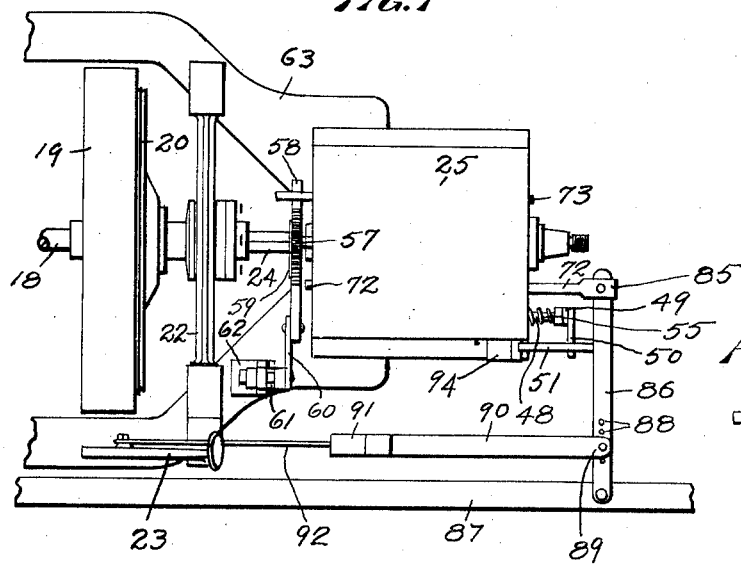

Aug. 13, 1929.  J. BLACKBURN  1,724,000
SLIDING GEAR TRANSMISSION AND METHOD OF OPERATING THE SAME
Filed Sept. 20, 1923  4 Sheets-Sheet 2

INVENTOR
JASPER BLACKBURN
ATTY.

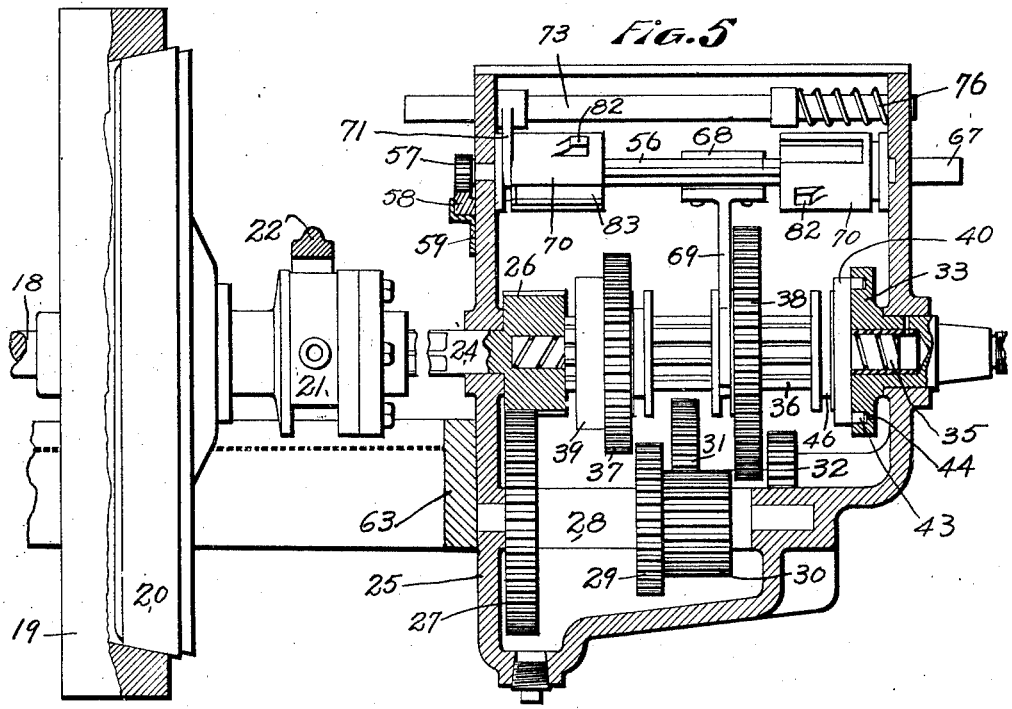
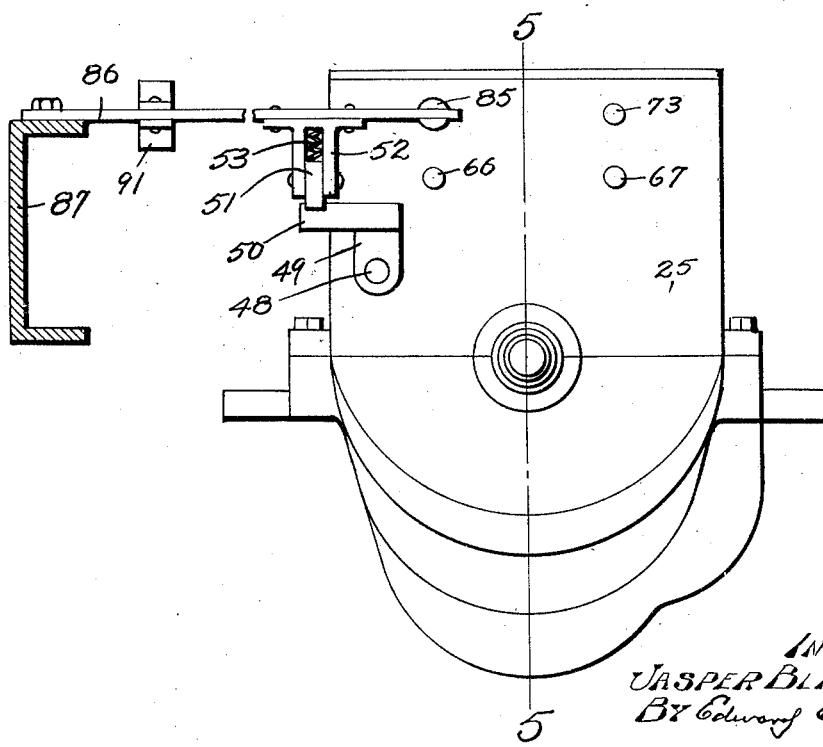

Aug. 13, 1929. J. BLACKBURN 1,724,000
SLIDING GEAR TRANSMISSION AND METHOD OF OPERATING THE SAME
Filed Sept. 20, 1923 4 Sheets-Sheet 4
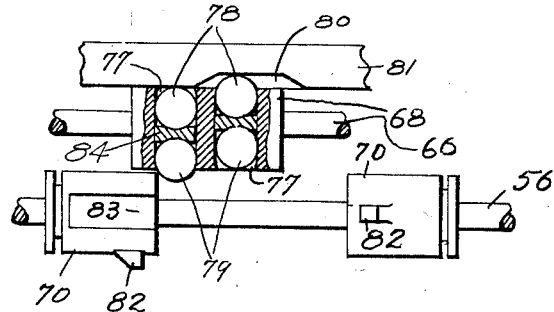
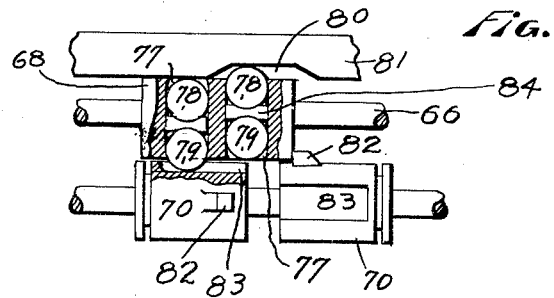
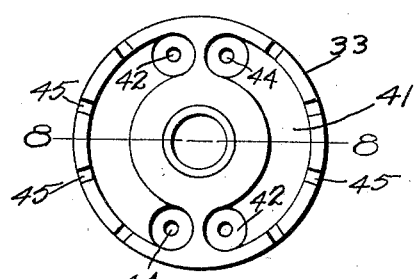
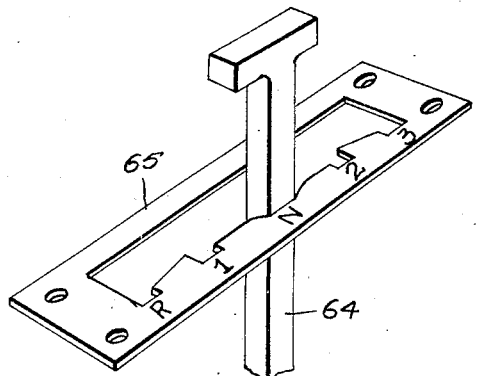
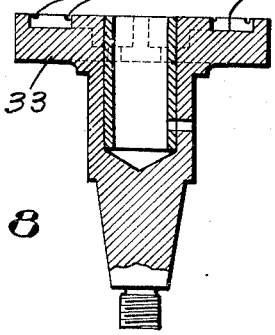
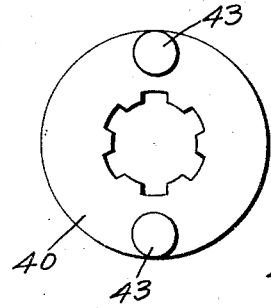
INVENTOR
JASPER BLACKBURN
By Edward E. Lugan
ATTY.

Patented Aug. 13, 1929.

1,724,000

UNITED STATES PATENT OFFICE.

JASPER BLACKBURN, OF WEBSTER GROVES, MISSOURI.

SLIDING GEAR TRANSMISSION AND METHOD OF OPERATING THE SAME.

Application filed September 20, 1923. Serial No. 663,780.

My invention relates to improvements in sliding gear transmissions and method of operating the same and has for its primary object a sliding gear transmission in which both the driven and driving ends are disconnected or declutched from the remainder of the power and driving plant or mechanism during the time that the initial engagement of the gears takes place.

A further object is to construct a sliding gear transmission having both its driven and driving shafts provided with clutches; a clutch on the driving shaft being so arranged as to be declutched after the clutch on the driven shaft has been declutched and to be returned into clutching position before the clutch on the driven end is restored to its working position.

A still further object is to construct a sliding gear transmission which is so arranged that the gears are either at a standstill or substantially so at the same time when the shifting is commenced thereby avoiding all clashing of gears and all danger of stripping same.

In the drawings:

Fig. 1 is a top plan view of a transmission embodying my invention;

Fig. 2 is a side elevation of the same;

Fig. 5 is a vertical longitudinal cross section taken on the line 5—5 of Fig. 6;

Fig. 6 is an enlarged rear elevation of the transmission;

Fig. 7 is a face view of one of the members of the rear or driving shaft clutch;

Fig. 8 is a cross section of the same taken on the line 8—8 of Fig. 7;

Fig. 9 is a face view of the sliding member employed in the rear clutch;

Fig. 10 is a side elevation of the same;

Fig. 11 is a front elevation of the pre-selecting lever employed;

Fig. 12 is a side elevation of the same;

Fig. 13 is a perspective view of the floor plate employed in connection with the pre-selecting lever;

Fig. 14 is an enlarged fragmental view of the means employed to permit the disengagement of the engine clutch prior to the disengagement of the driving or propeller shaft clutch;

Fig. 15 is an enlarged view of the dog or latch made use of to disconnect the driving shaft clutch;

Fig. 16 is a diagrammatic sectional view showing one manner of shifting the gears, and Fig. 17 is a similar view illustrating another operation in the gear shift.

Figure 3:
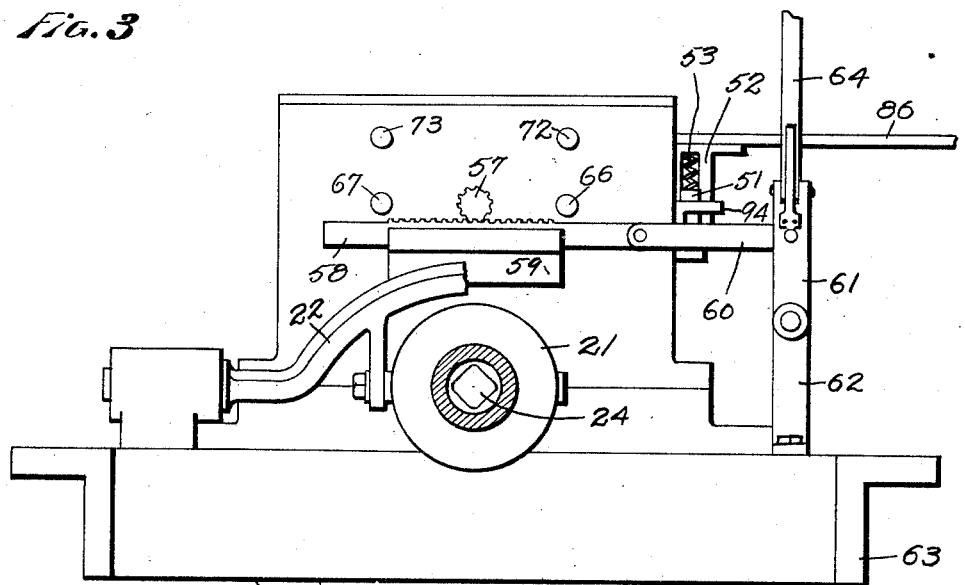
Fig. 3 is an enlarged front elevation of the transmission and clutch operating mechanism with parts broken away.
Figure 4:
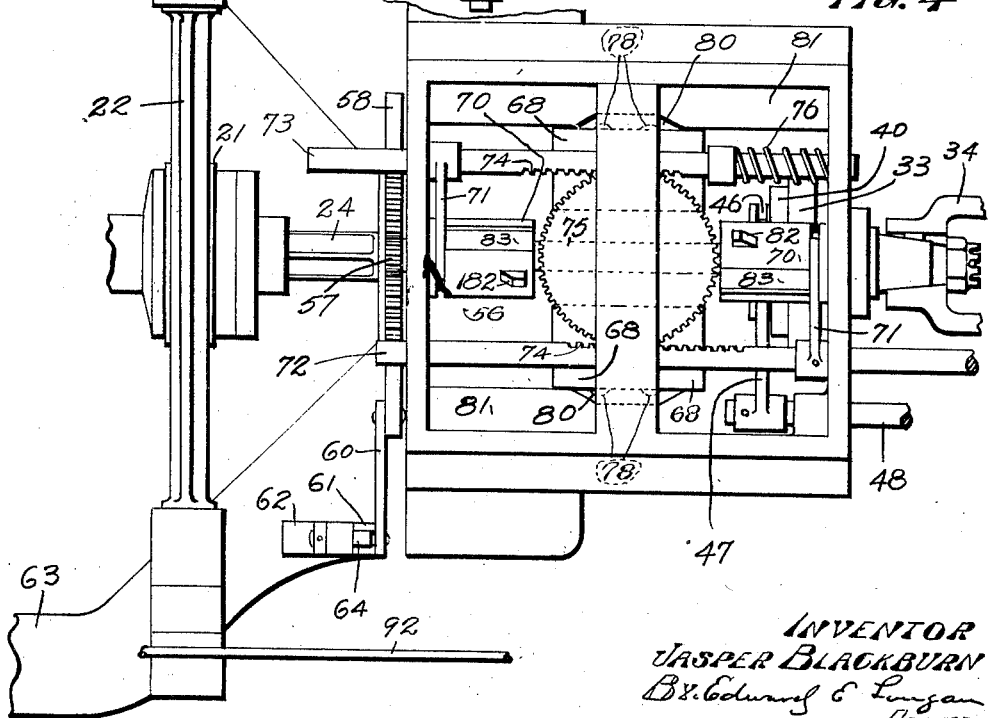
Fig. 4 is a top plan view of the transmission with the transmission housing cover removed.

In the construction of my device 18 represents an engine shaft on which is mounted a fly-wheel 19. Engaging with the fly-wheel is a clutch member 20, this clutch member is provided with a clutch collar 21 which is designed to be operated by means of the yoke 22. This yoke in turn being operated by means of a pedal 23. The clutch is slidably mounted on a shaft 24, which will hereafter be termed the driven shaft because it receives its power from the engine.

The shaft 24 extends into the transmission housing 25. Located within the housing 25 and formed integral with the shaft 24 is a gear 26, this gear meshes with the gear 27 which is carried by the counter-shaft 28. The counter-shaft 28 also carries gears 29 and 30, being respectively second and low speed gears. Meshing with the gear 30 is a gear 31, this gear together with the gear 32 constituting the reverse drive. It will be noted from the drawings that the gear 26 is mounted adjacent the front wall of the housing 25. Directly opposite the gear 26 is mounted a clutch member 33 which extends through the rear wall of the housing and which is designed to carry one portion of a universal coupling 34. To the portion of the universal coupling is attached a second portion of a universal coupling which is carried by the driving or propeller shaft. This universal coupling and propeller shaft construction is in universal use on motor vehicles and therefore will not be described in detail.

Carried by the gear 26 and clutch member 33 are reduced ends 35 of a splined-shaft 36 and on this shaft are slidably mounted gears 37 and 38. The gear 37 is provided with a forwardly extending flange 39 so that engagement can be had with the gear 26. This construction however, is also old and will therefore not be described in detail. Mounted slidably on the shaft 36 is a clutch member 40, this clutch member is designed to engage with the member 33. The clutch member 33 is provided in its face with arcuate grooves 41, these grooves terminate in circular recesses 42 and are for the purpose of permitting pins 43 carried by the clutch member 40 to enter and secure the two members together for rotation. The recesses 42 are provided with openings 44 so as to prevent any formation of a vacuum within the recesses and also to permit the passage of transmission oil therefrom, either one of which might effect the operation of the clutch. The face of the clutch member 33 is also provided with radially arranged recesses 45 which serve the same purpose as the openings 44, that of preventing the formation of a vacuum and permitting the squeezing out of oil so that the clutch members can take hold readily.

The clutch member 40 is provided with a groove 46 in which a fork 47 is seated, this fork is for the purpose of engaging and disengaging the clutch members 40 and 33. The fork 47 is secured to a shaft 48 which extends through the rear wall of the housing 25. The outward end of the shaft 48 is provided with a sleeve 49 which carries a bar 50. The bar 50 is adapted to be engaged with the latch 51. The latch 51 is pivotally mounted in a forked bracket 52 and is pressed downward by means of a coil spring 53. The purpose of this spring is to prevent the latch 51 from vibrating up and down due to road shocks. The latch 51 is provided with a notch 54 which is adapted to pass over the bar 50.

Surrounding the shaft 48 and between the sleeve 49 and rear wall of the housing 25 is a coil spring 55, the purpose of which is to normally hold the clutch members 33 and 40 in engagement. Mounted in the housing 25 and adjacent its top is a spline-shaft 56, the forward end of which projects through the housing and is provided with a gear 57 which gear meshes with a rack 58. This rack is slidably carried in a guide 59. To one end of the rack 58 is attached a link 60, the opposite end of the link is attached to a lever 61 which is pivotally mounted in a bracket 62 which is carried by the transmission support 63. This transmission support also carries the yoke 22. The upper end of the lever 61 is bifurcated and carries an extension 64. This extension projects upward through the floor of the car and through the floor plate 65. The floor plate is provided with a plurality of notches (see Fig. 13) which are adapted to receive and hold the extension 64 in various positions. These various positions determining the speed and direction of the vehicle. Mounted to either side of the shaft 56 are shifter bars 66 and 67 which are provided with a central enlargement 68. This central enlargement carries a shifter fork 69. The fork on the bar 67 shifting the gear 38 while the fork on the bar 66 shifts the gear 37. Slidably mounted on the shaft 56 are cylindrical members 70, these members are operated by means of forks 71 which are carried by the bars 72 and 73. The bars 72 and 73 are provided with rack teeth 74 which mesh with a gear 75. The purpose of this rack and gear being to move the bars 72 and 73 in opposite directions simultaneously so that the shifting members will be moved to and from each other. The shaft 73 is provided with a coil spring 76, the purpose of which is to normally hold the members 70 in spaced apart position. The enlargement 68 is also provided with openings 77 which extend entirely therethrough and in which are located balls 78 and 79. These balls are adapted to be extended or projected outward so as to be brought into the path of travel of the shifting members 70. This is for the purpose of returning the device to neutral position because when the balls 78 enter the recess 80 formed in the projecting members 81, the members 70 can freely pass, but when in the position shown in Fig. 16 the end of one of the shifting members will contact with the projecting ball and carry the member 68 backward until the ball 78 can drop into the recess 80. The shifter members are also provided with projections 82 and recesses 83. The projections 82 being designed to come in contact with the member 68 and move it into the position indicated in Fig. 17 thus shifting the gear. In this position it is necessary that the recess 83 of the opposite shifter member be in alinement with the balls 79 thus allowing the member 68 to be moved into position. The recess 83 permitting the ball to enter therein and project from the member 68. Were this recess not present it would be impossible to shift the gears because the projection of the ball would preclude the sliding movement of the shifter members 70. It is to be noted in this connection that the openings 77 are restricted at each end so as to prevent the balls 78 and 79 from dropping out, and in the event that the balls are of such size as not to contact, filler blocks 84 are placed between the balls so as to hold them in the positions indicated in Figs. 16 and 17.

The shaft 72 projects rearwardly from the housing 25 and is provided with a bifurcated enlargement 85 in which one end of a lever 86 is pivotally secured. It will be noted that the end of this lever is slotted so that it will have no twisting effect on the shaft 72. The opposite end of the lever 86 is pivotally secured to the chassis frame 87. The lever 86 also carries the bracket 52. The lever 86 is provided with a plurality of openings 88 by means of which the forked end 89 of the bar 90 can be adjustably attached thereto. The purpose of this is to increase or decrease the fulcrum, or in other words regulate the amount of travel of the free end of the lever 86 in proportion to the travel of the clutch and foot pedal.

The forward end of the bar 90 is provided with a yoke 91 through which extends a shaft 92, this shaft is provided with a head 93, which head is located within the yoke. The opposite end of the shaft or rod 92 is pivotally attached to the foot pedal 23. It will be noted from Figs. 2 and 14 that a certain amount of play or forward movement of the foot pedal 23 is permitted before any pull will be exerted on the bar 90. The purpose of this play is to permit the engine clutch 20 to be disengaged before the bar 90 commences to move.

Secured to the housing 25 is a bracket 94, the purpose of which is to engage with the inclined forward end 95 of the latch 51 and raise the same so as to release it from engagement with the bar 50 and permit the clutch members 33 and 40 to re-engage.

The movement of the lever 86 also operates the rods 72 and 73 by means of which the gear shifting is accomplished.

The operation of my device is as follows:—

When it is desired to start the car the device being in neutral, the engine is first set in motion, this places in motion the gear 26 and the gears carried by the counter-shaft. The lever 61 is then moved so that the extension comes to rest in the recess marked 1 on Fig. 13. The forward or low speed having now been selected the device is ready to be shifted and the operator presses down on the pedal 23. The first movement will be to disengage the clutch 20 and declutch the device at the driven end, this brings the head 93 against the yoke 91. A continued downward movement of the pedal 23 now exerts pressure on the lever 86 swinging it forward. This moves the shaft 72 forward and the shaft 73 rearward and at the same time moves the shaft 48 forward and disconnects or declutches the driving end. At the time that this driving end is disconnected the gears 36 and 30 are about to be meshed. A continued downward movement of the clutch pedal carries these gears into mesh and at the same time continues to move the clutch member 40 away from the member 33. The beveled or inclined end of the dog or latch 51 is now in contact with the bracket 94 and commences to ride up on the same and by the time the gears are about half in mesh the latch 51 is released from the bar 50 and the clutch member 40 again seated through the action of the spring 55. The foot pedal however is still pressed forward until the complete shift has been made, after which the pedal is released and the clutch 20 again permitted to come in engagement, the lever 86 being of course restored to its normal position, with the exception of the bars 72 and 73. The manner in which this shift is made is illustrated in Fig. 17, which brings the projection 82 in contact with the member 68 on the bar 66, which carries forward the fork 69 and with it the gear 38. When the car is traveling in low speed and it is desired to advance to second, the lever 61 is so moved that the extension 64 enters the recess marked 2 and the former operation is repeated with this exception, that as the shifter members 70 move toward each other the forward shifter member will come in contact with the ball 79 and move the member 68 backward so that the balls 78 will both be in the recess 80. A continued forward movement brings the members 70 still closer together permitting the projection on the forward member to engage with the enlargement 68 on the shaft 66, thus moving it backward and meshing the gears 37 and 38, at the same time permitting the ball 79 to enter the recess 83 on the rear shifter member 70. Thus it will be seen that by my operation both ends of the transmission are disconnected or declutched from the rest of the machine while the shifting is taking place and the rear end connected when the shifting has the gears about half way engaged, but while the front still remains disengaged. But at no time is there any power whatsoever rotating the gears in the transmission during the initial engagement of the gears. In this way all breakage or clashing of gears is eliminated and it is impossible to shift gears without declutching both ends.

I may also if desired use my device with the ordinary hand shift as some drivers prefer to have a car built that way. In this instance the operation is substantially the same except that the shifting of gears is done by hand while the transmission is disconnected or declutched at the driving and driven ends.

I do not desire to limit myself to the precise construction of clutches shown as there are various commercial types of clutches which can be used in lieu of those illustrated to accomplish my purpose.

The spring 53 in addition to holding the latch 51 against vibration also causes the notch 54 to act as a lock so as to prevent any possibility of the rear clutch becoming disengaged so that I do not have to depend on the spring 55 alone for performing this duty.

Having fully described my invention, what I claim is:—

1. In a sliding gear transmission, a preselecting mechanism, a gear shifting mechanism, a clutch located at the driven end of said transmission, a clutch located at the driving end of said transmission, means for disengaging said clutches in sequence, means operated by said clutch disengaging means for operating the gear shifting mechanism after said clutches have been released, and means for releasing the clutch at the driving end of said transmission from its operating mechanism when the gear shifting has been partially completed.

2. In a sliding gear transmission, a preselecting mechanism, a gear shifting mechanism operated thereby, a clutch located at the driven end of said transmission, means for disengaging said clutch, a clutch located at the driving end of said transmission, a lever mechanism secured to the first mentioned clutch disengaging means for disengaging the second mentioned clutch after the first mentioned clutch has been disengaged, means operated by said lever mechanism for operating the gear shifting mechanism when the clutches have been disengaged, and means for re-engaging the second mentioned clutch after the shifting has been partially completed.

3. In a sliding gear transmission, a clutch secured to its driven end, a second clutch secured to its driving end, a preselecting mechanism, a gear shifting mechanism, a lever mechanism for disengaging said clutches in sequence, a connection between said lever mechanism and the gear shifting mechanism for shifting the gears while said clutches are disengaged, and means for automatically engaging the second mentioned clutch after the shifting has been partially completed.

4. In a sliding gear transmission, a housing containing gears, a clutch secured to the driven end of said transmission, means for operating said clutch, a second clutch secured to the driving end of said transmission, a gear shifting mechanism, means operated by the clutch disengaging means for operating said gear shifting mechanism during a portion of the disengaging of the first mentioned clutch, said shifting means also adapted to disengage the second mentioned clutch after the first mentioned clutch has been disengaged, and means for permitting said second mentioned clutch to automatically re-engage in advance of the completion of the shift.

5. In a sliding gear transmission comprising a housing, a plurality of gears mounted in said housing, a plurality of gears slidably mounted in said housing, a driven shaft for placing some of said gears in operation, a driving shaft adapted to be driven by the sliding gears, a clutch mounted on the driven shaft, a second clutch mounted on the driving shaft, a pre-selecting means for pre-selecting one of the sliding gears, means for operating the clutch on the driven shaft, said means also serving to disengage the second clutch after the first mentioned clutch has been disconnected and for shifting the pre-selected gear after said disconnections have been made, and means for automatically permitting the re-engagement of the second mentioned clutch when the shifting has been partially completed.

6. In a sliding gear transmission, a clutch secured to its driven end, a second clutch secured to its driving end, means for disengaging said clutches in sequence, said means also shifting said transmission while said clutches are disengaged, means for automatically permitting the engagement of the second mentioned clutch during a portion of said shifting, and means for holding said second mentioned clutch in engaged position.

7. In a sliding gear transmission, a preselecting mechanism, a clutch located at its driven end, a pedal for operating said clutch, a second clutch located at its driving end, means operated by the pedal for releasing the second mentioned clutch after the first mentioned clutch has been released, means operated by said pedal for shifting the preselected gear in said transmission, means for automatically re-engaging the second mentioned clutch while the first mentioned clutch is out of engagement, and means for holding said second mentioned clutch in engagement.

8. In a sliding gear transmission comprising a transmission having clutches located at its driven and driving ends, a preselecting mechanism, a gear shifting mechanism, a lever mechanism for releasing the driven and driving clutches in sequence, a connection between said lever mechanism and shifting mechanism whereby the same is operated after said clutches have been disengaged, and means for automatically releasing the driving clutch from the disengaging means when the shifting has been partially completed.

9. In a sliding gear transmission, a preselecting mechanism, means for operating said preselecting mechanism, a clutch located at the driven end of said transmission, a clutch located at the driving end thereof, a lever mechanism for disengaging said clutches in sequence and thereafter shifting said transmission to a preselected speed, and means for releasing the clutch at the driving end while the disengaging and shifting movement of the lever is being continued, whereby the clutch at the driving end may be re-engaged independently of the clutch at the driven end.

10. In a sliding gear transmission, a preselecting mechanism, a shifting mechanism, a clutch located at its driven end, a foot lever for operating said clutch, a lever pivotally mounted at one end to a support for operating the shifting mechanism, a connection between the foot lever and last mentioned lever, a clutch located at the driving end of said transmission, means carried by the pivoted lever for operating the last mentioned clutch, and means for disengaging said clutch operating means from the last mentioned clutch at a predetermined position of the pivoted lever, whereby the clutch at the driving end may be re-engaged independently of the movement of the foot lever and while the shifting is partially completed.

11. In a sliding gear transmission, a foot operated preselecting mechanism, a gear shifting mechanism, a clutch located at the driven end of said transmission, a foot operated lever for operating said clutch, a pivoted lever for operating the gear shifting mechanism, a connection between the foot lever and last mentioned lever for operating the same, a clutch located at the driving end of said transmission, a latch pivotally carried by the pivoted lever for engaging with the last mentioned clutch and operating the same, and means for releasing said latch from said clutch during the forward movement of said lever, whereby said last mentioned clutch is re-engaged independently of the first mentioned clutch.

12. The combination with a transmission mechanism and a plurality of clutches for controlling the connection of said mechanism to the driving and the driven elements of a motor vehicle, of a member operable in a single direction to effect the disengagement of said clutches and the engagement of one of said clutches.

13. The combination with a transmission mechanism and a plurality of clutches for controlling the connection of said mechanism to the driving and the driven elements of a motor vehicle, of a member operable in a single direction to successively effect the disengagement of said clutches in sequence and the engagement of the last clutch to be disengaged.

14. The combination with a transmission mechanism and a plurality of clutches for controlling the connection of said mechanism to the driving and the driven elements of a motor vehicle, of a member operable in a single direction to successively effect the disengagement of said clutches in sequence and the engagement of the last clutch to be disengaged and operable in the other direction to effect the engagement of the first clutch to be disengaged.

15. The combination with a transmission mechanism and two clutches for respectively connecting said mechanism to the driving and the driven members of a motor vehicle, of a pedal operable during its forward movement to effect the disengagement of said clutches in sequence and the engagement of the last clutch to be disengaged and operable during its return movement to effect the engagement of the other clutch.

In testimony whereof, I have signed my name to this specification.

JASPER BLACKBURN.